US011028198B2

(12) United States Patent
Kaspar et al.

(10) Patent No.: US 11,028,198 B2
(45) Date of Patent: Jun. 8, 2021

(54) TETRAFLUOROETHYLENE AND PERFLUORINATED ALLYL ETHER COPOLYMERS

(71) Applicant: 3M INNOVATIVE PROPERTIES COMPANY, St. Paul, MN (US)

(72) Inventors: Harald Kaspar, Burgkirchen (DE); Klaus Hintzer, Kastl (DE); Markus E. Hirschberg, Burgkirchen (DE); Herbert Koenigsmann, Burgkirchen (DE); Karl D. Weilandt, Afton, MN (US); Tilman C. Zipplies, Burghausen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 78 days.

(21) Appl. No.: 16/325,831

(22) PCT Filed: Aug. 1, 2017

(86) PCT No.: PCT/US2017/044962
§ 371 (c)(1),
(2) Date: Feb. 15, 2019

(87) PCT Pub. No.: WO2018/034839
PCT Pub. Date: Feb. 22, 2018

(65) Prior Publication Data
US 2019/0202951 A1 Jul. 4, 2019

Related U.S. Application Data

(60) Provisional application No. 62/376,075, filed on Aug. 17, 2016.

(51) Int. Cl.
| | | |
|---|---|---|
| C08F 214/26 | (2006.01) | |
| C08F 214/28 | (2006.01) | |
| H01B 3/44 | (2006.01) | |
| C08L 27/18 | (2006.01) | |
| C08L 27/20 | (2006.01) | |
| C08F 214/18 | (2006.01) | |

(52) U.S. Cl.
CPC .......... *C08F 214/26* (2013.01); *C08F 214/28* (2013.01); *C08L 27/18* (2013.01); *C08L 27/20* (2013.01); *H01B 3/445* (2013.01); *C08F 214/182* (2013.01); *C08L 2203/16* (2013.01); *C08L 2203/18* (2013.01)

(58) Field of Classification Search
None
See application file for complete search history.

(56) References Cited

U.S. PATENT DOCUMENTS

| | | | |
|---|---|---|---|
| 2,559,752 A | 7/1951 | Berry | |
| 3,085,083 A | 4/1963 | Schreyer | |
| 3,282,875 A | 11/1966 | Connolly | |
| 3,718,627 A | 2/1973 | Grot | |
| 4,267,364 A | 5/1981 | Grot | |
| 4,273,729 A | 6/1981 | Krespan | |
| 4,292,449 A * | 9/1981 | Krespan | .................. C07C 41/54 |
| | | | 568/649 |
| 4,349,650 A | 9/1982 | Krespan | |
| 4,552,925 A * | 11/1985 | Nakagawa | ............ C08F 214/26 |
| | | | 525/199 |
| 4,621,116 A | 11/1986 | Morgan | |
| 4,743,658 A | 5/1988 | Imbalzano | |
| 5,182,342 A | 1/1993 | Feiring | |
| 5,285,002 A | 2/1994 | Grootaert | |
| 5,378,782 A | 1/1995 | Grootaert | |
| 5,442,097 A | 8/1995 | Obermeier | |
| 5,463,021 A | 10/1995 | Beyer | |
| 5,677,404 A | 10/1997 | Blair | |
| 5,703,185 A | 12/1997 | Blair | |
| 6,255,536 B1 | 7/2001 | Worm | |
| 6,429,258 B1 | 8/2002 | Morgan | |
| 6,541,588 B1 | 4/2003 | Kaulbach | |
| 6,613,941 B1 | 9/2003 | Felix | |
| 6,693,164 B2 | 2/2004 | Blong | |
| 6,706,193 B1 | 3/2004 | Burkard | |
| 6,743,508 B2 | 6/2004 | Kono | |
| 6,794,550 B2 | 9/2004 | Hintzer | |

(Continued)

FOREIGN PATENT DOCUMENTS

| | | | | |
|---|---|---|---|---|
| EP | 0147594 A1 * | 7/1985 | ............... | C08K 7/08 |
| EP | 2409998 A1 | 1/2012 | | |

(Continued)

OTHER PUBLICATIONS

Machine translation of JP 2004244504 A, retrieved Jun. 2020 (Year: 2020).*
Auhl, "Molecular Characterization of Semi-Fluorinated Copolymers with a Controlled Amount of Long-Chain Branching", Macromolecules, 2006, vol. 39, No. 06, pp. 2316-2324.
Hintzer, "Melt Processable Tetrafluoroethylene-Perfluoropropylvinyl Ether Copolymers (PFA)", 1997, p. 227.
Scheirs, "Modern Fluoropolymers: High Performance Polymers For Diverse Applications", 1997, p. 227.

(Continued)

*Primary Examiner* — Nicole M. Buie-Hatcher
(74) *Attorney, Agent, or Firm* — Thomas M. Spielbauer

(57) ABSTRACT

A copolymer having tetrafluoroethylene units and second polymerized monomer units in a range from 0.2 to 1 percent by weight, based on the total weight of the copolymer. Rf is a linear or branched perfluoroalkyl group having from 1 to 8 carbon atoms and optionally interrupted by one or more —O— groups, n is independently from 1 to 6, and z is 0, 1, or 2. The copolymer has a melt flow index in a range from 0.02 grams per 10 minutes to 19.4 grams per 10 minutes. The copolymer can be extruded to make articles, such as insulated cables. A method of making the copolymer is also disclosed.

16 Claims, No Drawings

(56) References Cited

U.S. PATENT DOCUMENTS

| | | |
|---|---|---|
| 7,018,541 B2 | 3/2006 | Hintzer |
| 7,122,609 B2 | 10/2006 | Earnest, Jr. |
| 7,126,056 B2 | 10/2006 | Earnest, Jr. |
| 7,671,112 B2 | 3/2010 | Hintzer |
| 7,754,821 B2 * | 7/2010 | Isogai .............. C08F 8/00 |
| | | 525/326.4 |
| 7,923,519 B2 | 4/2011 | Kono |
| 2006/0199898 A1 | 9/2006 | Funaki |
| 2006/0223924 A1 | 10/2006 | Tsuda |
| 2006/0281946 A1 | 12/2006 | Morita |
| 2007/0015865 A1 | 1/2007 | Hintzer |
| 2007/0060699 A1 | 3/2007 | Tsuda |
| 2007/0117915 A1 | 5/2007 | Funaki |
| 2007/0142513 A1 | 6/2007 | Tsuda |
| 2007/0142541 A1 | 6/2007 | Hintzer |
| 2007/0149733 A1 | 6/2007 | Otsuka |
| 2013/0172477 A1 * | 7/2013 | Hintzer ............ C08F 16/24 |
| | | 524/544 |
| 2015/0218296 A1 * | 8/2015 | Kaspar ............ C08F 214/26 |
| | | 526/254 |

FOREIGN PATENT DOCUMENTS

| | | | | |
|---|---|---|---|---|
| EP | 2767557 A1 * | 8/2014 | ............ | C08K 7/18 |
| GB | 1210794 | 10/1970 | | |
| GB | 1571356 A * | 7/1980 | ............ | C07C 51/31 |
| JP | 2004244504 A * | 9/2004 | | |
| RU | 2408608 C2 | 1/2011 | | |
| WO | WO 01/49752 A2 | 7/2001 | | |
| WO | WO 2014-186647 | 11/2014 | | |
| WO | WO 2016-028539 | 2/2016 | | |

OTHER PUBLICATIONS

Scheirs, "Modern Fluoropolymers: High Performance Polymers For Diverse Applications", 1997, p. 241.

Tuminello, "Molecular Weight and Molecular Weight Distribution From Dynamic Measurements of Polymer Melts", Polymer Engineering and Science, 1986, vol. 26, No. 19, pp. 1339-1347.

International Search Report for PCT International Application No. PCT/US2017/044962, dated Oct. 24, 2017, 5 pages.

* cited by examiner

TETRAFLUOROETHYLENE AND PERFLUORINATED ALLYL ETHER COPOLYMERS

BACKGROUND

Melt processable copolymers of tetrafluoroethylene (TFE) and one or more perfluorinated copolymers have useful properties such as chemical resistance, weather resistance, low flammability, thermal stability, and excellent electrical properties. Such beneficial properties render these fluoropolymers useful, for example, in articles such as tubes, pipes, foils, and films. Various embodiments of copolymers of tetrafluoroethene and hexafluoropropylene (HFP), known under the name FEP (that is, fluorinated ethylene—propylene copolymer), have been reported useful as coatings for wires and cables. See, for example, U.S. Pat. Nos. 5,677,404 and 5,703,185, each to Blair; 6,541,588 (Kaulbach); 6,743,508 and 7,923,519, each to Kono; and 7,122,609 and 7,126,056, each to Earnest.

SUMMARY

The present disclosure provides tetrafluoroethylene (TFE) copolymers useful, for example, for wire coating. The copolymers of the present disclosure have a melt flow index (MFI) from 1 g/10 min up to 19 g/10 min. TFE copolymers modified with perfluorinated alkyl allyl ethers can advantageously be produced, for example, by aqueous emulsion polymerization at higher temperatures (e.g., higher than 70° C. or 80° C.) than TFE copolymers modified with corresponding perfluorinated vinyl ethers. Such polymers may also have a low amount of extractable perfluorinated carboxylic acids, in particular perfluorinated octanoic acid.

In one aspect, the present disclosure provides a copolymer having tetrafluoroethylene units and units independently represented by formula

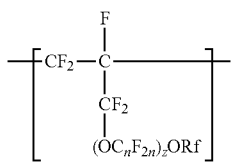

in a range from 0.2 to 12 percent by weight, based on the total weight of the copolymer. Rf is a linear or branched perfluoroalkyl group having from 1 to 8 carbon atoms and optionally interrupted by one or more —O— groups, n is independently from 1 to 6, and z is 0, 1, or 2. The copolymer has a melt flow index in a range from at least 1 gram per 10 minutes to 19 grams per 10 minutes. In some embodiments, the copolymer has up to 200 —$SO_2X$ groups per $10^6$ carbon atoms and up to 100 unstable end groups per $10^6$ carbon atoms. In the —$SO_2X$ groups, X is independently —F, —$NH_2$, —OH, or —OZ, wherein Z is independently a metallic cation or a quaternary ammonium cation. The unstable end groups typically comprise at least one of —COOM, —$CH_2OH$, —COF, and —$CONH_2$, wherein M is independently an alkyl group, a hydrogen atom, a metallic cation, or a quaternary ammonium cation. In some embodiments, the copolymer includes units derived from perfluorinated terminal olefins having from 3 to 8 carbon atoms.

In another aspect, the present disclosure provides a method of making an article. The method includes melt-shaping a composition that includes the copolymer described above. In some embodiments, the melted composition consists of the copolymer described above. In some embodiments, the article is a film, tube, pipe, or hose. In some embodiments, the melted composition is extruded onto a conductor. In some embodiments, the melted composition is extruded onto a cable.

In another aspect, the present disclosure provides an article that includes the copolymer described above. In some embodiments, the article is a film, tube, pipe, or hose. In some embodiments, the article is a conductor having the copolymer extruded on it. In some embodiments, the article is a cable having the copolymer extruded on it.

In another aspect, the present disclosure provides a method of making the copolymer described above. The method includes copolymerizing components that include tetrafluoroethylene and at least one compound independently represented by formula $CF_2$=$CFCF_2(OC_nF_{2n})_zORf$. Rf is a perfluoroalkyl group having from 1 to 8 carbon atoms and optionally interrupted by one or more —O— groups, n is independently from 1 to 6, and z is 0, 1, or 2. Copolymerizing may be carried out, for example, by aqueous emulsion polymerization or suspension polymerization. In some embodiments, the components include at least one perfluorinated terminal olefin independently having from 3 to 8 carbon atoms.

In this application: Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "perfluoro" and "perfluorinated alkyl or alkylene groups" refer to alkyl groups or alkylene groups in which all C—H bonds are replaced by C—F bonds.

The phrase "interrupted once or more than by at least one —O— group", for example, with regard to a perfluoroalkyl or perfluoroalkylene group refers to having part of the perfluoroalkyl or perfluoroalkylene on both sides of the —O— group. For example, —$CF_2CF_2$—O—$CF_2$—$CF_2$— is a perfluoroalkylene group interrupted once by an —O—, and —$CF_2$—O—$CF_2CF_2$—O—$CF_2$— is a group interrupted twice by an —O— group.

All numerical ranges are inclusive of their endpoints. All numerical ranges of physical properties and amounts of ingredients are alos inclusive of nonintegral values between the endpoints unless otherwise stated (e.g., 1 to 5 includes 1, 1.5, 2, 2.75, 3, 3.80, 4, 5, etc.).

DETAILED DESCRIPTION

The copolymer according to the present disclosure may be useful for a variety of applications. For example, copolymers according to the present disclosure are useful for making melt-shaped articles or in the production of melt-shaped articles. The copolymers may be particularly suitable for insulating cable or wire. Such insulated cable may be useful, for example, as a communication cable (e.g., a data transmission cable such as a "Local Area Network" (LAN) cable). In general, the insulated cable can be manufactured by extrusion coating molten copolymer in the shape of a tube and then drawing down the copolymer by inserting a core wire through the center portion of the resin tube in its axial direction. The term "draw-down" as used herein means extending a molten resin extruded from a die having an opening of relatively large sectional area to its final intended dimensions. The draw-down is characterized by a draw-down ratio (DDR), which is the ratio of the sectional area of the opening of the die to the sectional area of the insulated material of the final product. In general, the draw-down ratio is suitably from 50 to 150.

The copolymer according to the present disclosure includes tetrafluoroethylene units. The tetrafluorethene units may be present in a range of at least 50% by weight preferably at least 66% by weight or even at least 75% by weight based on the weight of the polymer (meaning all ingredients ad up to give 100% by weight). The tetrafluoroethene units are copolymerized with one or more units independently represented by formula:

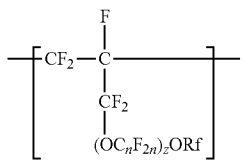

in which n is independently from 1 to 6, z is 0, 1, or 2, and Rf is a linear or branched perfluoroalkyl group having from 1 to 8 carbon atoms and optionally interrupted by one or more —O— groups. In some embodiments, z is 1. In some embodiments, n is from 1 to 4, or from 1 to 3, or from 2 to 3, or from 2 to 4. In some embodiments, n is 1 or 3. In some embodiments, n is 3. When z is 2, the n in the two $C_nF_{2n}$ groups may be independently selected. However, within a $C_nF_{2n}$ group, a person skilled in the art would understand that n is not independently selected. $C_nF_{2n}$ may be linear or branched. In some embodiments, $C_nF_{2n}$ can be written as $(CF_2)_n$, which refers to a linear perfluoroalkylene group. In some embodiments, $C_nF_{2n}$ is —$CF_2$—$CF_2$—$CF_2$—. In some embodiments, $C_nF_{2n}$ is branched, for example, —$CF_2$—$CF(CF_3)$—.

In some embodiments, $(OC_nF_{2n})_z$ is represented by —O—$(CF_2)_{1-4}$—$[O(CF_2)_{1-4}]_{0-1}$. In some embodiments, Rf is a linear or branched perfluoroalkyl group having from 1 to 8 (or 1 to 6) carbon atoms that is optionally interrupted by up to 4, 3, or 2 —O— groups. In some embodiments, Rf is a perfluoroalkyl group having from 1 to 4 carbon atoms optionally interrupted by one —O— group.

In embodiments in which z is 1 or 2, copolymers are prepared by copolymerizing components including tetrafluoroethylene and at least one perfluoroalkoxyalkyl allyl ether independently represented by formula $CF_2$=$CFCF_2(OC_nF_{2n})_zORf$, in which n and Rf are as defined above in any of their embodiments. Examples of suitable perfluoroalkoxyalkyl allyl ethers include
$CF_2$=$CFCF_2OCF_2CF_2OCF_3$,
$CF_2$=$CFCF_2OCF_2CF_2CF_2OCF_3$,
$CF_2$=$CFCF_2OCF_2OCF_3$, $CF_2$=$CFCF_2OCF_2OCF_2CF_3$,
$CF_2$=$CFCF_2OCF_2CF_2CF_2CF_2OCF_3$,
$CF_2$=$CFCF_2OCF_2CF_2OCF_2CF_3$,
$CF_2$=$CFCF_2OCF_2CF_2CF_2OCF_2CF_3$,
$CF_2$=$CFCF_2OCF_2CF_2CF_2CF_2OCF_2CF_3$,
$CF_2$=$CFCF_2OCF_2CF_2OCF_3$,
$CF_2$=$CFCF_2OCF_2CF_2OCF_2CF_2OCF_3$,
$CF_2$=$CFCF_2OCF_2CF_2OCF_2CF_2CF_2OCF_3$,
$CF_2$=$CFCF_2OCF_2CF_2OCF_2CF_2CF_2CF_2OCF_3$,
$CF_2$=$CFCF_2OCF_2CF_2OCF_2CF_2CF_2CF_2OCF_3$,
$CF_2$=$CFCF_2OCF_2CF_2(OCF_2)_3OCF_3$,
$CF_2$=$CFCF_2OCF_2CF_2(OCF_2)_4OCF_3$,
$CF_2$=$CFCF_2OCF_2CF_2OCF_2OCF_2OCF_3$,
$CF_2$=$CFCF_2OCF_2CF_2OCF_2CF_2CF_3$,
$CF_2$=$CFCF_2OCF_2CF_2OCF_2CF_2OCF_2CF_2CF_3$,
$CF_2$=$CFCF_2OCF_2CF(CF_3)$—O—$C_3F_7$, and $CF_2$=$CFCF_2(OCF_2CF(CF_3))_2$—O—$C_3F_7$. Many of these perfluoroalkoxyalkyl allyl ethers can be prepared, for example, according to the methods described in U.S. Pat. No. 4,349,650 (Krespan), are commercially available, for example from Anles, St. Petersburg, Russia or can be prepared my routes known to the skilled person.

In some embodiments of the copolymer according to the present disclosure, z is 0, and Rf is as defined above in any of its embodiments. In these embodiments, copolymers according to the present disclosure can be prepared by copolymerizing components including tetrafluoroethylene and at least one perfluoroalkyl allyl ether independently represented by formula $CF_2$=$CFCF_2ORf$, in which Rf is as defined above in any of its embodiments. Examples of suitable perfluoroalkyl allyl ethers include $CF_2$=$CF$—$CF_2$—O—$CF_3$, $CF_2$=$CF_2$—$CF_2$—O—$C_2F_5$, and $CF_2$=$CF$—$CF_2$—O—$C_3F_7$.

The copolymerized units independently represented by formula:

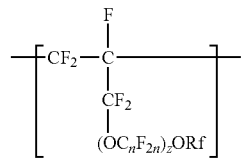

may be present in the copolymer according to the present disclosure in a range from 0.2 to 12 percent by weight based on the weight of the polymer (total weight of the polymer being 100% by weight), and in some embodiments they may be present in a range from 0.5 to 6% by weight based on the total weight of the copolymer. In another embodiment the units represented by the above formula are present in the above mentioned weight percent range with the proviso that their molar amount does not exceed 2.0 mole percent and preferably does not exceed 1.9 mole % (based on the total amount of the copolymer, ie. the copolymer making up 100% by mole). In some embodiments, the copolymerized units represented by this formula are present in the copolymer in an amount up to 1.5 mole percent or up to 1.0 mole percent. In some embodiments, the copolymerized units represented by this formula are present in the copolymer in an amount of at least 0.03 mole percent or 0.05 mole percent. The copolymerized units may be present in the copolymer in a range from 0.02 mole percent to 2 mole percent, 0.03 mole percent to 1.5 mole percent, or 0.05 mole percent to 1.0 mole percent. Copolymers according to the present disclosure may include any combination of one or more of these copolymerized units according to any of the above embodiments.

The copolymer according to the present disclosure preferably is essentially free of copolymerized units derived from a perfluorinated alkyl vinyl ether. "Essentially free" as used herein is referred to an amount of 0 to 0.9% by weight, preferably from 0 to 0.1% by weight. The copolymers of the present disclosure are preferably prepared without using any vinyl ethers, although minor amounts of vinyl ethers present as impurities may be tolerated but preferably are avoided. For example, the copolymers are essentially free of copolymerized units presented by formula:

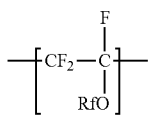

in which Rf is a linear or branched perfluoroalkyl group having from 1 to 8 carbon atoms optionally interrupted by one or more —O— groups. In some of these embodiments, Rf is a linear or branched perfluoroalkyl group having from 1 to 8 carbon atoms (that is, not interrupted by one or more —O— groups). In some embodiments, Rf is a linear or branched perfluoroalkyl group having from 1 to 6, 1 to 5, 1 to 4, or 1 to 3 carbon atoms. These units are typically incorporated into the copolymer by including perfluoroalkyl vinyl ethers [e.g., perfluoromethyl vinyl ether ($CF_2$=$CFOCF_3$), perfluoroethyl vinyl ether ($CF_2$=$CFOCF_2CF_3$), and perfluoropropyl vinyl ether ($CF_2$=$CFOCF_2CF_2CF_3$)] in the components that are copolymerized.

In another example the copolymers are essentially free copolymerized vinyl ether represented by formula:

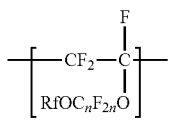

In which n and Rf are as defined above in any of the embodiments described for perfluoroalkoxyalkyl allyl ether units. These units are typically incorporated in the art into copolymers by including at least one perfluoroalkoxyalkyl vinyl ether independently represented by formula $CF_2$=$CFOC_nF_{2n}ORf$, in which n and Rf are as defined above in any of their embodiments, in the components to be polymerized. Examples of perfluoroalkoxyalkyl vinyl ethers to be preferably avoided include $CF_2$=$CFOCF_2OCF_3$, $CF_2$=$CFOCF_2OCF_2CF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2CF_2OCF_2CF_3$, $CF_2$=$CFOCF_2CF_2CF_2OCF_2CF_3$, $CF_2$=$CFOCF_2CF_2CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFOCF_2CF_2OCF_2OCF_2OCF_3$, $CF_2$=$CFOCF_2CF_2OCF_2CF_3$, $CF_2$=$CFOCF_2CF_2OCF_2CF_2OCF_2CF_3$, $CF_2$=$CFOCF_2CF(CF_3)$—O—$C_3F_7$ (PPVE-2), $CF_2$=$CF(OCF_2CF(CF_3))_2$—O—$C_3F_7$ (PPVE-3), and $CF_2$=$CF(OCF_2CF(CF_3))_3$—O—$C_3F_7$ (PPVE-4).

The copolymer according to the present disclosure can have in a range from 0 to 200 —$SO_2X$ groups per $10^6$ carbon atoms. In the —$SO_2X$ groups, X is independently —F, —$NH_2$, —OH, or —OZ, wherein Z is independently a metallic cation (e.g., an alkali-metal cation such as sodium or potassium) or a quaternary ammonium cation (e.g., tetraalkyl ammonium, wherein alkyl has from 1 to 4, 1 to 3, or 1 to 2 carbon atoms). In some embodiments, X is independently —F, —OH or —OZ. In some embodiments, X is independently —OH or —OZ. In some of these embodiments, Z is a metal cation (e.g., an alkali-metal cation such as sodium or potassium). The —$SO_2X$ groups may be present in copolymerized units of the copolymer, at the ends of copolymer chains, or a combination thereof.

In some embodiments, the copolymer according to the present disclosure includes copolymerized units comprising —$SO_2X$ groups. In some embodiments, these units are represented by formula

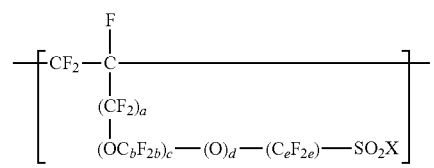

wherein a is 0 or 1, each b is independently from 1 to 4, c is 0 to 4, d is 0 or 1, e is 1 to 6, and X is as defined above in any of its embodiments. In some embodiments, b is 1 to 3, 1 to 2, or 1. In some embodiments, c is 0, 1, or 2; 1 or 2; or 0 or 1. In some embodiments, e is 1 to 4, 1 to 3, or 1 to 2. In some embodiments, c is 0, d is 1, and e is 1 to 4. In some embodiments, a is 0, $OC_bF_{2b}$ is $OCF_2CF(CF_3)$, c is 1 or 2, d is 1, and e is 1 to 4. In some embodiments, a is 1, b is 1, c is 0 to 4, d is 1, e is 1 to 4. $C_eF_{2e}$ may be linear or branched. In some embodiments, $C_eF_{2e}$ can be written as $(CF_2)_e$, which refers to a linear perfluoroalkylene group. When c is 2, the b in the two $C_bF_{2b}$ groups may be independently selected. However, within a $C_bF_{2b}$ group, a person skilled in the art would understand that b is not independently selected.

These units comprising —$SO_2X$ groups may be incorporated into the copolymer by including one or more olefin monomers independently represented by formula $CF_2$=$CF(CF_2)_a$—$(OC_bF_{2b})_c$—$(O)_d$—$(C_eF_{2e})$—$SO_2X$, wherein a, b, c, d, e, and X are as defined above, in the components that are copolymerized. Examples of suitable olefin monomers represented by formula $CF_2$=$CF(CF_2)_a$—$(OC_bF_{2b})_c$—$(O)_d$—$(C_eF_{2e})$—$SO_2X$ include $CF_2$=$CF$—$CF_2$—$SO_2X$, $CF_2$=$CF$—O—$CF_2$—$CF_2$—$SO_2X$, $CF_2$=$CF$—$CF_2$—O—$CF_2$—$CF_2$—$SO_2X$, $CF_2$=$CF$—O—$(CF_2)_4$—$SO_2X$, $CF_2$=$CF$—$CF_2$—O—$(CF_2)_4$—$SO_2X$, and $CF_2$=$CF$—O—$CF_2$—$CF(CF_3)$—O—$CF_2$—$CF_2$—$SO_2X$. Certain of these olefin monomers are commercially available. Others may be prepared by known methods. See, for example, U.S. Pat. No. 3,282,875 (Connolly), U.S. Pat. No. 3,718,627 (Grot), U.S. Pat. No. 4,267,364 (Grot), and U.S. Pat. No. 4,273,729 (Krespan). To achieve a range from 0 to 200 —$SO_2X$ groups per $10^6$ carbon atoms, the amount of $CF_2$=$CF$—O—$CF_2$—$CF(CF_3)$—O—$CF_2$—$CF_2$—$SO_2X$, for example, is typically less than 0.18 weight percent (wt. %), based on the total weight of the monomers incorporated into the copolymer.

In some embodiments, the copolymer according to the present disclosure comprises a copolymer of tetrafluoroethylene (TFE), units independently represented by formula

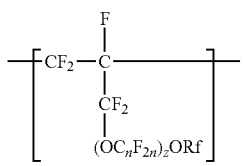

and units derived from perfluorinated terminal olefins independently having from 3 to 8 carbon atoms. In some embodiments, the perfluorinated terminal olefin units independently have from 3 to 7, 3 to 6, 3 to 5, or 3 to 4 carbon atoms. In some embodiments, the perfluorinated terminal olefins providing these units comprise at least one of $CF_2$=CF—$CF_3$ or $CF_2$=CF—$C_2F_5$. In some embodiments, the perfluorinated terminal olefin units are hexafluoropropylene (HFP) units. The copolymers according to the present disclosure are at least partially crystalline fluoroplastics. A person skilled in the art can select the amount of perfluorinated terminal olefins to include in the polymerization to make an at least partially crystalline fluoroplastic. In some embodiments, the perfluorinated terminal olefin units may be present in a range from 5 weight percent (wt. %) to 22 wt. %, in a range from 10 wt. % to 17 wt. %, or in a range from 11 wt. % to 16 wt. %, based on the total weight of the copolymer (the weight of the copolymer being 100% by weight).

In some embodiments, the copolymer according to the present disclosure comprises a copolymer of TFE, HFP, and units independently represented by formula

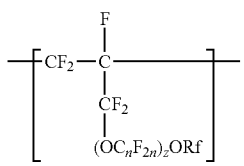

The HFP may be present in a range from 5 wt. % to 22 wt. %, in a range from 10 wt. % to 17 wt. %, in a range from 11 wt. % to 16 wt. %, or in a range from 11.5 wt. % to 15.8 wt. %, based on the total weight of the copolymer (the total weight of the copolymer making up 100% by weight).

The copolymers according to the present disclosure typically have a melting point between 220° C. to 285° C., in some embodiments, 235° C. to 275° C., 240° C. to 275° C., or 245° C. to 265° C. Preferably, the melting point is from 245° C. to 265° C.

The molecular weights of certain fluoroplastics are often characterized by the melt viscosity or the melt flow index (MFI; e.g., 372° C./5 kg)). The copolymer according to the present disclosure has an MFI of up to 19 grams per 10 minutes and of at least 1 g per 10 minutes. In some embodiments, the copolymer according to the present disclosure has an MFI of 1 to 15 grams per 10 minutes or from 1 to 10 grams per 10 minutes. The copolymer according to the present disclosure can be adjusted to have an MFI as described above by adjusting the amount of the initiator and/or chain-transfer agent used during polymerization, both of which affect the molecular weight and molecular-weight distribution of the copolymer. MFI can also be controlled by the rate of addition of initiator to the polymerization. Variations in the monomer composition can also affect the MFI. For the purposes of the present disclosure, MFI is measured according to the test method described in the Examples, below.

At a given MFI, even relatively low levels of a comonomer having a perfluorinated ether pendant group as described herein can improve the properties of a TFE-containing copolymer. For example, even at low levels, a comonomer having a perfluorinated ether pendant group may increase the elongation viscosity of an FEP copolymer and may have a positive effect on the rupture durability and cable burn performance of the FEP copolymer.

The production of foamed insulation cable is different from the high-line-speed production of solid wire insulation, and lower MFIs such as those described herein may be useful in the production of foamed insulation cable. Thus, in some embodiments, the copolymer according to the present disclosure is foamed. In these embodiments, the copolymer generally may include a foam cell nucleating agent (e.g., a $F(CF_2)_xCH_2CH_2$-sulfonic or phosphonic acid or salt, wherein x is 6, 8, 10, or 12 or a mixture thereof that may or may not be combined with boron nitride). Likewise, in some embodiments of the extruded article according to and/or made according to the present disclosure, the extruded article is foamed or does include a foam cell nucleating agent. In some of these embodiments, the extruded article is a foamed insulation cable.

In one embodiment the FEP copolymers have a broad molecular-weight distribution. To achieve a broad molecular-weight distribution, a mixture of at least two FEP copolymers with largely differing molecular weights (as measured by MFI, for example) can be used. The desired mixtures are often produced by polymerizing the components separately and mixing them in form of the latices, reactor beads, or fluff before melt pelletizing.

In contrast, in some embodiments, the copolymer according to the present disclosure has a relatively low polydispersity. The polydispersity, which is a ratio of the weight-average molecular weight (Mw) to the number-average molecular weight (Mn) of the copolymer, can be up to about 2.5, 2.3, 2.2, or 2.0. The polydispersity may be as low as 1.5. Polydispersity is measured according to a modified version of the method published by W. H. Tuminello in Polym. Eng. Sci. 26, 1339 (1986), described in the Examples, below.

The copolymers may be polymerized by using the ingredients and their amounts such that the resulting copolymer has a tensile strength at 23° C. of at least 15 MPa, for example between 20 and 60 MPa (DIN EN ISO 527-1, version in force in 2015). The copolymers may be polymerized by using the ingredients and their amounts such that the resulting copolymer has an elongation at break at 23° C. of at least 250% (length/length), in some embodiments between 250 and 400% (DIN EN ISO 527-1, version in force in 2015). The copolymers may be polymerized by using the ingredients and their amounts such that the resulting copolymer has a flexural modulus at 23° C. of at least 500, in some embodiments between 520 and 600 MPa ASTM D 790, version in force in 2015; injection molded bars, 127 by 12.7 by 3.2 mm)

Copolymers according to the present disclosure can be prepared in a variety of ways. Conveniently, the method of making the copolymer according to the present disclosure includes radical aqueous emulsion polymerization.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. Examples of suitable emulsifiers include perfluorinated and partially fluorinated emulsifier having the formula

$$[R_f\text{—}O\text{—}L\text{—}COO^-]_iX^{i+} \quad (I)$$

wherein L represents a linear, branched or cyclic, partially or fully fluorinated alkylene group or an aliphatic hydrocarbon group, Rf represents a linear partially or fully fluorinated aliphatic group or a linear partially or fully fluorinated aliphatic group interrupted with one or more oxygen atoms, $X^{i+}$ represents a cation having the valence i and i is 1, 2 or 3 and includes Fit (See, e.g., U.S. Pat. No. 7,671,112 to Hintzer et al.). Additional examples of suitable emulsifiers also include perfluorinated polyether emulsifiers having the formula $CF_3$—$(OCF_2)_x$—$O$—$CF_2$—$X$, wherein x has a value of 1 to 6 and X represents a carboxylic acid group or salt thereof, and the formula $CF_3$—$O$—$(CF_2)_3$—$(OCF(CF_3)$—$CF_2)_y$—$O$—$L$-$Y$ wherein y has a value of 0, 1, 2 or 3, L represents a divalent linking group selected from —$CF(CF_3)$—, —$CF_2$—, and —$CF_2CF_2$—, and Y represents a carboxylic acid group or salt thereof (See, e.g., U.S. Pat. Publ. No. 2007/0015865 to Hintzer et al.). Other suitable emulsifiers include perfluorinated polyether emulsifiers having the formula $R_f$—$O(CF_2CF_2O)_xCF_2COOA$ wherein $R_f$ is $C_bF_{(2b+1)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f\text{—}(O)_t\text{—}CHF\text{—}(CF_2)_x\text{—}COO\text{—}]_iX^{i+}$ wherein Rf represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513 each to Tsuda et al. and 2006/0281946 to Morita et al. Fluoroalkyl, for example, perfluoroalkyl carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful.

If desired, the emulsifiers can be removed or recycled from the fluoropolymer latex as described in U.S. Pat. No. 5,442,097 to Obermeier et al., 6,613,941 to Felix et al., 6,794,550 to Hintzer et al., 6,706,193 to Burkard et al., and 7,018,541 to Hintzer et al.

It is contemplated that in some embodiments the copolymers may be prepared by a polymerization process conducted with no emulsifier or with no fluorinated emulsifier, for example by methods as disclosed in U.S. patent application No. US2007/0149733.

The polymerization is preferably carried out without adding any perfluorinated alkanoic acids, in particular perfluorinated alkanoic acids with 6 to 14 carbon atoms, and in particular with 8 carbon atoms (perfluorinated octanoic acid (PFOA)) to the reaction mixture. Perfluorinated alkanoic acids can be expressed by the general formula:

$$Rf\text{—}(CF_2)_n\text{—}A \quad (II)$$

wherein Rf is a perfluorinated alkyl radical that only contains F and C atoms, n is an integer of 5 to 14 and A is an acid anion salt, for example a —$COO^-X$ wherein X is $H^+$, or a cationic salt such as $NH_4^+$ or $Na^+$ another metal salt. Perfluorinated alkanoic acids have become under increased scrutiny because of their environmental persistence and bioaccumulation. Therefore, there use is avoided. However, even if no such emulsifiers are used in the preparation of the polymers, they may be generated in situ in certain reactions. As another advantage, the copolymers of the present disclosure may have a very low extractable amount of perfluorinated alkanoic acids, for example amounts of less than 100 ppb based on the weight of $C_6$-$C_{12}$, preferably $C_6$ to $C_{14}$ perfluorinated alkanoic acids, and may have an amount of extractable octanoic acid ($C_8$) of less than 50 ppb, preferably less than 30 ppb—based on the weight of the polymer.

In some embodiments of the method of making the copolymer according to the present disclosure, a water-soluble initiator can be useful to start the polymerization process. Salts of peroxy sulfuric acid, such as ammonium persulfate or potassium persulfate, are typically applied either alone or sometimes in the presence of a reducing agent, such as bisulfites or sulfinates (e.g., fluorinated sulfinates disclosed in U.S. Pat. Nos. 5,285,002 and 5,378,782, both to Grootaert) or the sodium salt of hydroxy methane sulfinic acid (sold under the trade designation "RONGALIT", BASF Chemical Company, New Jersey, USA). The choice of initiator and reducing agent, if present, will affect the end groups of the copolymer. The concentration range for the initiators and reducing agents can vary from 0.01% to 5% by weight based on the aqueous polymerization medium.

In some embodiments, at least some of the —$SO_2X$ groups present in the copolymers according to the present disclosure are introduced by generating $SO_3^-$ radicals during the polymerization process. When salts of peroxy sulfuric acid are used in the presence of a sulfite or bisulfite salt (e.g., sodium sulfite or potassium sulfite), $SO_3^-$ radicals are generated during the polymerization process, resulting in —$SO_3^-$ end groups. By altering the stoichiometry of the sulfite or bisulfite salt versus the peroxy sulfuric acid salt, one can vary the amount of —$SO_2X$ end groups.

Most of the initiator systems and emulsifiers described above have an optimum pH-range where they show most efficiency. For this reason, buffers are sometimes useful. Buffers include phosphate, acetate, or carbonate (e.g., $(NH_4)_2 CO_3$ or $NaHCO_3$) buffers or any other acid or base, such as ammonia or alkali-metal hydroxides. The concentration range for the buffers can vary from 0.01% to 5% by weight based on the aqueous polymerization medium.

In some embodiments, the copolymers according to the present disclosure may include up to 100 ppm, 150 ppm, or more alkali-metal cations or alkaline-earth-metal cations. When alkali-metal salts or bases are used as initiators or buffers, for example, the copolymer according to the present disclosure generally comprises at least 50 ppm alkali-metal cations. We have found that the presence of alkali-metal cations in the copolymer increases the decomposition rate of unstable carboxylic end-groups during the drying step described below and therefore makes a subsequent post-fluorination step, if needed, easier, faster, and cheaper. In other embodiments of the method of making the copolymer according to the present disclosure, polymerization is conducted in the absence of added alkali-metal cations. In these embodiments, potassium persulfate, a common alternative initiator or co-initiator with ammonium persulfate, is not used. It is also possible to use organic initiators as disclosed in U.S. Pat. No. 5,182,342 (Feiring et al.). The copolymer produced can have less than 50 ppm alkali-metal cations, in some embodiments, less than 25 ppm, less than 10 ppm, or less than 5 ppm alkali-metal cations. To achieve such low alkali-metal content, the water for polymerization and washing may be deionized. Minimizing the alkali-metal salt concentration in the copolymer may minimize the formation of die drool that may form during a high-speed conductor coating operation on the outer surface of an extrusion die or on the guider tip inside the die. This die drool, if not minimized, can be periodically carried along the melt and/or the conductor to form undesirable lumps and may cause cone-breaks.

The alkali-metal ion content of the copolymer can be measured by flame atomic absorption spectrometry after combusting the copolymer and dissolving the residue in an acidic aqueous solution according to the method described in the Examples, below. For potassium as the analyte, the lower detection limit is less than 1 ppm.

Typical chain-transfer agents like H2, lower alkanes (preferably methane or ethane), alcohols (preferably methanol or ethanol), ethers (preferably dimethylether or butylmethylether), esters, and methylene fluoride may be useful in the preparation of the copolymer according to the present disclosure. Termination primarily via chain transfer results in a polydispersity of about 2 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 40° C. to 120° C. Typically, polymerization is carried out in a temperature range from 70° C. to 100° C. or 80° C. to 90° C. The polymerization pressure is usually in the range of 0.8 MPa to 2.5 MPa, and in some embodiments in the range from 1.0 MPa to 2.0 MPa. HFP and other perfluorinated terminal olefins can be precharged and fed into the reactor as described, for example, in *Modern Fluoropolymers*, ed. John Scheirs, Wiley & Sons, 1997, p. 241. Perfluorinated allyl ethers represented by formula $CF_2=CFCF_2(OC_nF_{2n})_z ORf$, wherein n, z, and Rf are as defined above in any of their embodiments, are typically liquids and may be sprayed into the reactor or added directly, vaporized, or atomized. Perfluorinated allyl ethers represented by formula $CF_2=CFCF_2 (OC_nF_{2n})_z ORf$ may also be pre-emulsified with an emulsifier before being combined with the other comonomers, for example, before addition of a gaseous fluoroolefin.

The obtained polymer dispersion after aqueous emulsion polymerization can be used as is or, if higher solids are desired, can be upconcentrated. To coagulate the obtained fluoropolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the fluoropolymer latex. Alternatively or additionally, the fluoropolymer latex may be frozen for coagulation or mechanically coagulated, for example, with a homogenizer as described in U.S. Pat. No. 5,463,021 (Beyer et al.). In some embodiments (e.g., in embodiments in which the copolymer comprises less than 50 ppm alkali-metal cation), it is useful to avoid alkali-metal salts as coagulants. It may also be useful to avoid acids and alkaline-earth-metal salts as coagulants to avoid metal contaminants.

The coagulated copolymer can be collected by filtration and washed with water. The washing water may, for example, be ion-exchanged water, pure water, or ultrapure water. The amount of the washing water may be from 1 to 5 times by mass to the copolymer, whereby the amount of the emulsifier attached to the copolymer can be sufficiently reduced by one washing.

The coagulated copolymer may be agglomerated to produce the polymer in agglomerate form. Agglomerates are typically free-flowing spherical beads with an average size (that is, diameter) of 1 mm to 5 mm. If the agglomerates obtained from agglomerating the coagulated copolymer are too small, it may be desirable to compact the agglomerate to produce a compacted agglomerate which will typically have an average size of 1 mm to 10 mm. In some embodiments, the coagulated copolymer is agglomerated with a water-immiscible organic liquid like gasoline as described in *Modern Fluoropolymers*, ed. by John Scheirs, Wiley & Sons, 1997, p. 227. The agglomerate can be dried, for example, by heating under moderate vacuum at temperatures up to 250° C., 200° C., 180° C., 150° C., or 130° C.

If the aqueous dispersion is the desired product, it may be treated by work-up procedures to remove fluorinated emulsifiers such as described by formula (I). Such work up procedures are known in the art and include anion-exchange and ultrafiltration. Such dispersion may contain from 1 to 50 ppm of the fluorinated emulsifiers used to prepare the products and less than 50 ppb of perfluoroalkanoic acid. Since non-ionic emulsifiers are typically added to stabilize the dispersion the resulting dispersion may additionally contain non-fluorinated emulsifiers, preferably non-aromatic, non-fluorinated emulsifiers, preferably in an amount of from 3 to 12% based on the total weight of the dispersion.

In some embodiments of the method of making the copolymer according to the present disclosure, radical polymerization also can be carried out by suspension polymerization. Suspension polymerization will typically produce particle sizes up to several millimeters.

In some embodiments, the copolymer may be melted, extruded, and cut into granulates of a desired size, which may be called melt granulate.

As used herein, the term "unstable end group" in the copolymers according to the present disclosure refers to —COOM, —CH$_2$OH, —COF, and —CONH$_2$, wherein M is independently an alkyl group, a hydrogen atom, a metallic cation, or a quaternary ammonium cation. In some embodiments, the unstable end groups are —COOM and —COF groups. Tetrafluoroethylene copolymers obtained by aqueous emulsion polymerization with inorganic initiators (e.g. persulfates, KMnO$_4$, etc.) typically have a high number of unstable carbon-based end groups (e.g. more than 200 —COOM end groups per $10^6$ carbon atoms). During work-up and melt-pelletizing of the tetrafluoroethylene copolymers, the copolymers take on a brownish appearance due to thermal degradation. In these cases, the number of unstable end groups may be unacceptable for further high-speed processing. Accordingly, the copolymers according to some embodiments of the present disclosure have up to 100 unstable end groups per $10^6$ carbon atoms. In some embodiments, the copolymers according to the present disclosure have up to 75, 50, 40, 30, 25, 20, 15, or 10 unstable end groups per $10^6$ carbon atoms. The number of unstable end groups can be determined by Fourier-transform infrared spectroscopy, as described in the Examples, below, or as known in the art.

The mechanism of the degradation of thermally unstable end groups has been described in some detail in *Modern Fluoropolymers*, John Wiley & Sons, 1997, in K. Hintzer and G. Lohr, 'Melt Processable Tetrafluoroethylene-Perfluoropropylvinyl Ether Copolymers (PFA)', page 227f. During the thermal degradation, corrosive gases are produced and considerably impair the quality of the final product via metal contamination or bubble formation, and can corrode tooling and processing machinery. The effect naturally increases as molecular weight decreases and melt flow index increases.

Various treatments of molten or unmolten fluoropolymer have been proposed to reduce the amount of unstable end groups, resulting in substantial suppression of thermal degradation. When the unstable end groups are acid end groups, —COF or —COOH, the fluoropolymer can be treated with ammonia to form the more stable amide end group —$CONH_2$ or with a primary or secondary amine (e.g., dimethyl, diethyl, or propyl amine) to form amide end groups —CONRH or —$CONR_2$, wherein R is/are the alkyl group(s) of the amine, and wherein for $R_2$, the alkyl groups are the same or different. When the unstable end groups are acid end groups, —COF or —COOH, the fluoropolymer can be treated with an alcohol, such as methanol, ethanol, propanol, or a fluorine-containing alcohol to form the more stable ester —COOR' where R' is the alkyl group supplied by the alcohol. When the unstable end groups are —COF or —COOM, the fluoropolymer can be decarboxylated to form the more stable —$CF_2H$ and —$CF(CF_3)H$ end groups, respectively. Treatment of fluoropolymers at high temperatures (e.g., 400° C.) with water vapor has been shown to reduce the number of unstable end groups, typically forming —$CF_2H$ and —$CF(CF_3)H$ end groups. See, e.g., U.S. Pat. No. 3,085,083 (Schreyer). The method of making the copolymer according to the present disclosure can include any of these methods.

Post-fluorination with fluorine gas is also commonly used to cope with unstable end groups and any concomitant discoloration. Post-fluorination typically results in a melt pelletized copolymer with an excellent color, and the number of unstable end groups is reduced almost to zero. Post-fluorination of the fluoropolymer can convert —COOH, amide, hydride, —COF, and other non-perfluorinated end groups or —CF═$CF_2$ to —$CF_3$ end groups. Converting the thermally unstable end groups into stable —$CF_3$ end groups by post-fluorination of agglomerate or melt granulate has been described, for example, in U.S. Pat. No. 4,743,658 (Imbalzano et al.) and Great Britain Patent GB1210794, published Oct. 28, 1970. A stationary bed of agglomerate may also be fluorinated as described in U.S. Pat. No. 6,693,164 (Blong).

In some embodiments, copolymers according to the present disclosure include —$CF_2H$ and/or —$CF(CF_3)H$ end groups. In some embodiments of the method according to the present disclosure (e.g., when alkali-metal cations are present) the dried polymer contains predominantly —$CF_2H$ and —$CF(CF_3)H$ end groups as described above. —$CF_2H$ and —$CF(CF_3)H$ end groups are sufficiently stable for some applications. However, if post-fluorination is desired to convert some of the —$CF_2H$ and —$CF(CF_3)H$ end groups into —$CF_3$ and —$C_2F_5$ end groups, respectively, the post-fluorination is generally easier and faster than when many —COOH end groups are present since a lower number of fluorination cycles is needed to convert the —$CF_2H$ or —$CF(CF_3)H$ end groups in comparison to —COOH end groups.

In some embodiments, the copolymer according to the present disclosure can be prepared by a method including a post-fluorination step after melt-pelletization of the polymer in order to remove unstable, carbon-based end groups (e.g. —COF, —COOM, —$CONH_2$, —$CH_2OH$). The post-fluorination can be conveniently carried out with nitrogen/fluorine gas mixtures in ratios of 80-90:20-10 at temperatures between 20° C. and 250° C., in some embodiments in a range of 50° C. to 200° C. or 70° C. to 120° C., and pressures from 1-10 bar. Under these conditions, most unstable carbon-based end groups are removed, whereas —$SO_2X$ groups mostly survive.

While in some embodiments, the copolymer according to the present disclosure has relatively few unstable end groups, it may be desirable to have a certain amount of polar groups to ensure good adhesion of the polymer to metal surfaces (e.g. copper wires). We have found that the more stable polar —$SO_2X$ groups ensure good adhesion to metal surfaces. These copolymers typically have a brilliant color and do not exhibit the brownish appearance that can occur when —COOM end groups thermally degrade. The copolymer according to the present disclosure has in a range from 0 to 200 —$SO_2X$ groups per $10^6$ carbon atoms, wherein X is as defined above in any of its embodiments. For excellent high frequencies transmissions, in some embodiments, the copolymer according to the present disclosure can have up to 150 —$SO_2X$ groups per $10^6$ carbon atoms. For promoting adhesion to metal surfaces, the copolymer according to some embodiments of the present disclosure has at least 5, 10, 15, 20, 25, 30, 35, 40, or 50 —$SO_2X$ groups per $10^6$ carbon atoms.

In some embodiments, the copolymer according to the present disclosure can be prepared by a method including a post-treatment with aqueous ammonia solution after the post-fluorination to obtain —$SO_2NH_2$ groups, a method including a post-treatment with aqueous alkaline hydroxide (e.g. LiOH, NaOH, or KOH) solution to obtain $SO_3$ alkaline-groups or subsequently $SO_3H$ groups, or a method including post-treatment with water and steam to form $SO_3H$ groups.

Some Embodiments of the Disclosure

In a first embodiment, the present disclosure provides a copolymer comprising tetrafluoroethylene units and units independently represented by formula

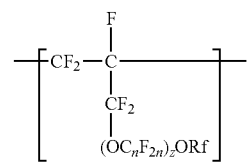

in a range from 0.2 to 12% by weight, based on the total weight of the copolymer, wherein n is independently from 1 to 6, z is 0, 1, or 2, and Rf is a linear or branched perfluoroalkyl group having from 1 to 8 carbon atoms and optionally interrupted by one or more —O— groups, wherein the copolymer has a melt flow index in a range from about 1 gram per 10 minutes to about 19 grams per 10 minutes measured at a temperature of 372° C. and at a support weight of 5.0 kg.

In a second embodiment, the present disclosure provides the copolymer of the first embodiment, wherein the copolymer has up to 200 —SO$_2$X groups per 10$^6$ carbon atoms, wherein X is independently —F, —NH$_2$, —OH, or —OZ, and wherein Z is independently a metallic cation or a quaternary ammonium cation.

In a third embodiment, the present disclosure provides the copolymer of the first or second embodiment, wherein the copolymer has up to 100 unstable end groups per 10$^6$ carbon atoms, wherein the unstable end groups are selected from —COOM, —CH$_2$OH, —COF, and —CONH$_2$, wherein M is independently an alkyl group, a hydrogen atom, a metallic cation, or a quaternary ammonium cation.

In a fourth embodiment, the present disclosure provides the copolymer of any one of the first to third embodiments, wherein Rf is —CF$_3$, and wherein n is 1 or 3.

In a fifth embodiment, the present disclosure provides the copolymer of any one of the first to fourth embodiments, wherein z is 1 or 2.

In a sixth embodiment, the present disclosure provides the copolymer of any one of the first to fourth embodiments, wherein z is 0.

In a seventh embodiment, the present disclosure provides the copolymer of any one of the first to sixth embodiments having not more than 50 unstable end groups per 10$^6$ carbon atoms.

In an eighth embodiment, the present disclosure provides the copolymer of any one of the first to seventh embodiments having not more than 25 unstable end groups per 10$^6$ carbon atoms.

In a ninth embodiment, the present disclosure provides the copolymer of any one of the first to eighth embodiments having at least 10 —SO$_2$X groups per 10$^6$ carbon atoms.

In a tenth embodiment, the present disclosure provides the copolymer of any one of the first to ninth embodiments having at least 25 or at least 50 —SO$_2$X groups per 10$^6$ carbon atoms.

In an eleventh embodiment, the present disclosure provides the copolymer of any one of the second to tenth embodiments, wherein the —SO$_2$X groups comprise —SO$_2$X end groups.

In a twelfth embodiment, the present disclosure provides the copolymer of any one of the first to eleventh embodiments, wherein the copolymer further comprises units represented by formula

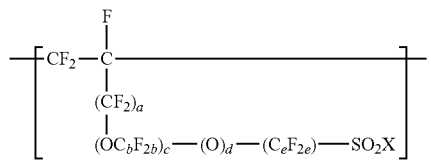

wherein a is 0 or 1, each b is independently from 1 to 4, c is 0 to 4, d is 0 or 1, e is 1 to 6, and X is independently —F, —NH$_2$, —OH, or —OZ, and wherein Z is independently a metallic cation or a quaternary ammonium cation.

In a thirteenth embodiment, the present disclosure provides the copolymer of any one of the first to twelfth embodiments, wherein the copolymer comprises less than 50 ppm alkali-metal cations.

In a fourteenth embodiment, the present disclosure provides the copolymer of any one of the first to twelfth embodiments, wherein the copolymer comprises at least 50 ppm alkali-metal cations.

In a fifteenth embodiment, the present disclosure provides the copolymer of any one of the first to fourteenth embodiments, wherein the copolymer has a polydispersity of less than or equal to 2.5.

In a sixteenth embodiment, the present disclosure provides the copolymer of any one of the first to fifteenth embodiments, further comprising units derived from at least one perfluorinated terminal olefin independently having from 3 to 8 carbon atoms.

In a seventeenth embodiment, the present disclosure provides the copolymer of the sixteenth embodiment, wherein the units derived from at least one perfluorinated terminal olefin are hexafluoropropylene units.

In an eighteenth embodiment, the present disclosure provides the copolymer of the seventeenth embodiment, wherein the hexafluoropropylene units are present in the copolymer at 5 percent to 22 percent by weight, preferably at 10 percent to 17 percent by weight, based on the total weight of the copolymer.

In a nineteenth embodiment, the present disclosure provides the copolymer of any one of the first to the eighteenth embodiments having a melting point in a range from 220° C. to 285° C., preferably 254° C. to 265° C.

In a twentieth embodiment, the present disclosure provides the copolymer of any one of the first to nineteenth embodiments, wherein the copolymer is not foamed.

In a twenty-first embodiment, the present disclosure provides the copolymer of any one of the first to nineteenth embodiments, wherein the copolymer is foamed.

In a twenty-second embodiment, the present disclosure provides the copolymer of any one of the first to twenty-first embodiments, wherein the copolymer has a melt flow index in a range from 1 gram per 10 minutes to 15 grams per 10 minutes, preferably from 1 g/10 minutes to 10 grams per 10 minutes.

In a twenty-third embodiment, the present disclosure provides a method of making an article, the method comprising shaping a melted composition comprising (or consisting of) the copolymer of any one of the first to twenty-second embodiments.

In a twenty-fourth embodiment, the present disclosure provides the method of the twenty-third embodiment, wherein the article comprises at least one of a film, tube, pipe, or hose.

In a twenty-fifth embodiment, the present disclosure provides the method of the twenty-third or twenty-fourth embodiment, wherein the melted composition is extruded onto a conductor.

In a twenty-sixth embodiment, the present disclosure provides the method of any one of the twenty-third to twenty-fifth embodiments, wherein the melted composition is extruded onto a cable or wire.

In a twenty-seventh embodiment, the present disclosure provides an extruded article comprising the copolymer of any one of the first to twenty-second embodiments.

In a twenty-eighth embodiment, the present disclosure provides the extruded article of the twenty-seventh embodiment, wherein the extruded article comprises at least one of a film, tube, pipe, or hose.

In a twenty-ninth embodiment, the present disclosure provides the extruded article of the twenty-seventh or twenty-eighth embodiment, wherein the extruded article is a conductor having the copolymer extruded thereon.

In a thirtieth embodiment, the present disclosure provides the extruded article of any one of the twenty-seventh to twenty-ninth embodiments, wherein the extruded article is a cable or wire having the copolymer extruded thereon.

In a thirty-first embodiment, the present disclosure provides the method of any one of the twenty-third to twenty-sixth embodiments or the extruded article of any one of the twenty-seventh to thirtieth embodiments, wherein the extruded article is not foamed.

In a thirty-second embodiment, the present disclosure provides the method of any one of the twenty-third to twenty-sixth embodiments or the extruded article of any one of the twenty-seventh to thirtieth embodiments, wherein the extruded article is foamed.

In a thirty-third embodiment, the present disclosure provides a method of making the copolymer of any one of the first to twenty-second embodiments, the method comprising copolymerizing components comprising tetrafluoroethylene and at least one compound independently represented by formula $CF_2=CFCF_2(OC_nF_{2n})_zORf$, wherein n is independently from 1 to 6, z is 0, 1, or 2, and Rf is a linear or branched perfluoroalkyl group having from 1 to 8 carbon atoms and optionally interrupted by one or more —O— groups.

In a thirty-fourth embodiment, the present disclosure provides the method of the thirty-third embodiment, wherein copolymerizing is carried out by aqueous emulsion polymerization.

In a thirty-fifth embodiment, the present disclosure provides the method of the thirty-third embodiment, wherein copolymerizing is carried out by suspension polymerization.

In a thirty-sixth embodiment, the present disclosure provides the method of any one of the thirty-third to thirty-fifth embodiments, wherein the components further comprise at least one perfluorinated terminal olefin independently having from 3 to 8 carbon atoms.

In a thirty-seventh embodiment, the present disclosure provides the method of any one of the thirty-third to thirty-sixth embodiments, wherein the components further comprise at least one compound represented by formula $CF_2=CF(CF_2)_a—(OC_bF_{2b})_c—(O)_d—(C_eF_{2e})—SO_2X$, wherein a is 0 or 1, each b is independently from 1 to 4, c is 0 to 4, d is 0 or 1, e is 1 to 6, wherein X is independently —F, —NH$_2$, —OH, or —OZ, and wherein Z is independently a metallic cation or a quaternary ammonium cation.

In a thirty-eighth embodiment, the present disclosure provides the method of any one of the thirty-third to thirty-seventh embodiments, wherein copolymerizing is carried out in the presence of a bisulfite or sulfite salt.

In a thirty-ninth embodiment, the present disclosure provides an aqueous dispersion comprising the copolymer of the first to the twenty-second embodiment.

In a fortieth embodiment, the present disclosure provides a copolymer according to any one of the first to the twenty-second embodiment wherein the copolymer is a polymer derived only from tetrafluoroethene, hexafluoropropene and one or more of the perfluorinated alkyl allyl ether comonomers described herein.

In order that this disclosure can be more fully understood, the following examples are set forth. It should be understood that these examples are for illustrative purposes only and are not to be construed as limiting this disclosure in any manner or to the specific examples provided. Abbreviations include g for grams, kg for kilograms, m for mass, mm for millimeters, L for liters, min for minutes, hrs for hours, rpm for revolutions per minute.

EXAMPLES

Test Methods:
MFI
The melt flow index (MFI), reported in g/10 min, was measured with a Goettfert MPX 62.92 melt indexer (Buchen, Germany) following a similar procedure to that described in DIN EN ISO 1133-1:2012-03 at a support weight of 5.0 kg and a temperature of 372° C. The MFI was obtained with a standardized extrusion die of 2.1 mm in diameter and a length of 8.0 mm.
Melting Point
The melting point of the fluorothermoplastic polymer was determined using differential scanning calorimetry following a similar procedure to that described in ASTM D4591-07 (2012) using a PerkinElmer Pyris 1 DSC (Waltham, Mass., USA) under nitrogen flow with a heating rate of 10° C./min. The reported melting points relate to the melting peak maximum.
Particle Size
The latex particle size determination was conducted by means of dynamic light scattering with a Malvern Zetasizer 1000HSA (Malvern, Worcestershire, UK) following a similar procedure to that described in DIN ISO 13321:2004-10. The reported average particle size is the z-average. Prior to the measurements, the polymer latexes as yielded from the polymerizations were diluted with 0.001 mol/L KCl-solution. The measurement temperature was 20° C. in all cases.
Monomer Unit Content
The content of $CF_2=CF—CF_2—O—(CF_2)_3—OCF_3$ (MA-31), $CF_2=CF—CF_2—O—C_3F_7$ (MA-3), $CF_2=CF—O—(CF_2)_3—OCF_3$ (MV-31), $CF_2=CF—O—C_3F_7$ (PPVE-1), $CF_2=CF—O—CF_2—CF(CF_3)—O—CF_2—CF_2—SO_2F$ (PSEPVE), and $CF_2=CF—CF_3$ (HFP) in the copolymer was determined by Fourier-transform infrared spectroscopy. Thin films of approximately 0.1 mm thickness were prepared by molding the polymer at 350° C. using a heated plate press. The films were than scanned in nitrogen atmosphere using a Nicolet DX 510 FT-IR spectrometer. The OMNIC software (ThermoFisher Scientific, Waltham, Mass., USA) was used for data analysis. The content of MA-31, MA-3, MV-31, PPVE-1, PSEPVE and HFP, reported in units of m/m %, was determined from an IR band at a monomer-specific wavenumber vm and was calculated as a product of a monomer-specific factor rel and the ratio of the absorbance of the IR-peak at $v_M$, $A(v_M)$, to the absorbance of the IR-peak at 2365 cm$^{-1}$, $A(2365\ cm^{-1})$, meaning $\varepsilon_{rel} \times A(v_M)/A(2365\ cm^{-1})$. Wavenumbers $v_M$ and factors $\varepsilon_{rel}$ are given in the following table:

| monomer | wavenumber $v_M$ [1/cm] | factor $\varepsilon_{rel}$ |
|---|---|---|
| $CF_2=CF—CF_2—O—(CF_2)_3—OCF_3$ | 892 | 3.81 |
| $CF_2=CF—CF_2—O—C_3F_7$ | 995 | 61 |
| $CF_2=CF—O—(CF_2)_3—OCF_3$ | 893 | 3.24 |
| $CF_2=CF—CF_3$ | 983 | 3.2 |

$CF_2=CF—CF_2—O—(CF_2)_3—O—CF_3$ (MA-31) was purchased from Anles in St. Petersburg (Russia). $CF_2=CF—CF_2—O—C_3F_7$ (MA-3) was prepared by reacting $CF_3—CF_2—COF/KF$ in glyme with $CF_2=CF—CF_2—O—SO_2F$ at 25° C. to 30° C.; boiling point of the allyl ether was 60° C. to 62° C.

End Group Analysis

Polymer end group detection was conducted in analogy to the method described in U.S. Pat. No. 4,743,658 (Imbalzano et al.). Thin films of approximately 0.50 mm were scanned on the same Nicolet Model 510 Fourier-transform infrared spectrometer. 16 scans were collected before the transform is performed, all other operational settings used were those provided as default settings in the Nicolet control software. Similarly, a film of a reference material known to have none of the end groups to be analysed was moulded and scanned. The reference absorbance spectrum is subtracted from the sample absorbance, using the interactive subtraction mode of the software. The $CF_2$ overtone band at 2365 wavenumbers is used to compensate for thickness differences between sample and reference during the interactive subtraction. The difference spectrum represents the absorbances due to non-perfluorinated polymer end groups. The number of end groups per million carbon atoms was determined via the equation: ends/1e6 carbons=absorbance×CF/film thickness in mm. The calibration factors (CF) used to calculate the numbers of end groups per million carbon atoms are summarized in the following table:

| End group | Wavenumber [1/cm] | Calibration Factor (CF) |
|---|---|---|
| —COF | 1885 | 1020 |
| —$CONH_2$ | 3438 | 1105 |
| —COOH, isolated | 1814 | 740 |
| —COOH, associated | 1775 | 112 |
| —$CF_2H$ | 2950-3050 (integrated) | 846 |
| —$CF(CF_3)H$ | 2820-3000 (integrated) | 224 |
| —$CF=CF_2$ | 1784 | 532 |
| —$SO_2F$ | 1467 | 400 |
| —$SO_3H$ | 1063 | 3030 |

After the interactive subtraction, the absorbance of the —$SO_3H$ peak was not quantified using the OMNIC software of the Nicolet Model 510 Fourier-transform infrared spectrometer, because the weak —$SO_3H$ peak is partially overlapping by other peaks in the direct neighborhood of 1063 1/cm and it appears as part of a peak-shoulder around 1050 1/cm. In this case, the deconvolution software "Peak Fit" from AISN Software Inc., version 4.06, was used to determine the absorbance the —$SO_3H$ peak. The automatic peak detection and fitting method II, second derivative method, was applied with usually about 22% smoothing to a wavenumber region of 1020 to 1075 1/cm. Four Pearson VII Amplitude peaks of uniform width and a linear 2 point baseline were usually applied to fit that region. The —$SO_3H$ peak is the one located at the highest wavenumber, the corresponding absorbance is the parameter a0 taken from peak fit summary.

The —$CF_2H$ peak is discernible at a peak around 3009 1/cm with a shoulder at about 2983 1/cm. The peak deconvolution procedure "Peak Fit" software from AISN Software Inc applied as described above in a region in between 2900 and 3100 1/cm reveals additional peaks located at about 2936, 2960, 3032 and 3059 1/cm. These peaks are integrated and the number of end groups per million carbon atoms was determined from the total peak area via the equation: ends/1e6 carbons=area×CF/film thickness in mm, wherein a Calibration Factor of 846 was applied.

The —$CF(CF_3)H$ group shows a broad peak band with main peaks around 2973, 2930 and 2858 1/cm. The peak deconvolution procedure "Peak Fit" software from AISN Software Inc applied in a region in between 2820 and 3000 1/cm may reveal additional peaks located at about 2830, 2845, 2871, 2885, 2900, 2916, 2943 and 2258 1/cm. These peaks are integrated and the number of end groups per million carbon atoms was determined from the total peak area via the equation: ends/1e6 carbons=area×CF/film thickness in mm, wherein a Calibration Factor of 224 was applied. When —$CF_2H$ groups and —$CF(CF_3)H$ groups are present at one time, the peak deconvolution procedure needs to be applied to the wavenumber region in between 2820 and 3050 1/cm. Then, the contributions of both groups to the broad peak need to be separated from each other and considered independently using the equations given above.

Polydispersity Determination by Melt Rheology

Oscillatory shear flow measurements were conducted on fluoropolymer melts using a strain controlled ARES rheometer (3ARES-13; Firmware version 4.04.00) (TA Instruments Inc., New Castle, Del., USA) equipped with a FRT 200 transducer with a force range of up to 200 g. Dynamic mechanical data were recorded in nitrogen atmosphere in frequency sweep experiments using a 25 mm parallel plate geometry and a plate to plate distance of usually 1.8 mm was realized. Individual frequency sweeps were recorded at a temperature of 372° C., 340° C., 300° C., 280° C. and in super-cooled melt at 260° C. The thermal control of the oven was operated using the sample/tool thermal element. A strain typically ascending from 1 to 20% was applied while the shear rate was descended from 100 rad/s to typically 0.1 rad/s. Using the time-temperature-superposition (TTS) tool provided by the orchestrator software (version 7.0.8.13), these individual frequency sweeps were combined to one master curve, wherein T=372° C. was selected as the reference temperature. Zero shear viscosities $r_t o$, reported in units of Pa×s, were extrapolated from the viscosity function $\eta^*(\omega)$ of the obtained dynamic mechanical master curve using the 4 parameter Carreau fit function provided by the orchestrator software. The molecular weight distribution of fluoropolymer melts were extracted from the so-obtained dynamic mechanical data by the procedure disclosed by W. H. Tuminello in Polym. Engineering Sci., 26, 1339-1347 (1986) and in Encyclopedia of Fluid Mechanics, Vol. 9, Polymer Flow Engineering, 209. The method includes that the frequency is converted into a molecular weight. In the present case, the equation $$1/\omega = 7.63e \times 22 \times M3.6$$

was used. In the same way as described by Tuminello, the cumulative molecular weight distribution (CMWD) is evaluated by forming the expression $$CMWD = 100 \times \{1 - [G''(\omega)/G_N^0]^{0.5}\}.$$

Herein, a plateau modulus of $G_N^0 = 1.1e6$ Pa was used. In modification of the method described by Tuminello, the sigmoidal CMWD is approximated by a function of the Weibull-type:

$$CMWD = 100*(1-\exp(-((x+d*(b-x0))/b)/\mathord{\wedge}c)), \text{ with}$$
$$x=\log M, d=((c-1)/c)/\mathord{\wedge}(1/c); c=3.376+2.305*b;$$
$$b=1.8+9.154e-4*600.95/\mathord{\wedge}\text{chi}$$

A user defined fit routine operating under the software SigmaPlot 12.5 (Systat Software, Inc.; San Jose/Calif., USA) was used to determine the two fit parameters x0 and chi. The first derivative of the fit function was evaluated by applying the macro "Compute 1$^{st}$ Derivative" provided by the SigmaPlot 12.5 software. The first derivative of the fit function is representing a Schulz-Zimm distribution described by Equation (6) in Auhl et al., Macromolecules 2006, Vol. 39, No. 6, p. 2316-2324. The maximum of this distribution is given by the number average molecular mass MN and its breadth is controlled by the degree of coupling k. The degree of coupling k is then converted into the polydispersity index $M_W/M_N$ according to a 5-order polynomial:

$$k=d0+d1\times U+d2\times U/\wedge 2+d3\times U/\wedge 3+d4\times U/\wedge 4+d5\times U/\wedge 5;$$
with $U=M_W/M_N$ $d0$=183.3296154186 $d1$=−445.7760158725 $d2$=443.8169326941 $d3$=−223.4535380971 $d4$=56.6264675389 $d5$=−5.7637913869

Finally, the consistency of the obtained result is probed by comparing the mass average molecular weight $M_W$ of this Schulz-Zimm distribution with the one obtained from the zero shear viscosity by:

$$\eta_0(372° C.)=9.36e-17\times M_W^{3.6}$$

The molecular weight distribution is correctly extracted from the rheology data in the case that both $M_W$ values deviate from each other by less than ±5%. The results reported herein fulfill this consistency criterion.

Alkali-Ion Content

For the determination of the alkali-ion content, 1 g polymer was combusted in a muffle-type furnace (Linn High Term; Eschenfelden, Germany; VMK39 µP) for 10 hrs (air at 550° C.). The incineration residue was dissolved into 50 mL of a 4 vol. % aqueous solution of HCl/HF (5:1) (HCl: 30% aqueous solution available from Merck, Darmstadt/Germany, under the trade designation "SUPRAPUR"; HF: 40% aqueous solution available from Merck, Darmstadt/Germany under the trade designation "SUPRAPUR"). The acidic solution was further analyzed by an "AANALYST 200" Perkin Elmer flame atomic absorption spectrometer (Waltham, Mass./USA). The instrument was calibrated with 0.500 ppm and 1.000 ppm potassium aqueous standard solutions (Merck; Darmstadt/Germany; "CERTIPUR" Element Standard Solution). The peak height at a wavelength of 766.5 nm was used to evaluate the potassium content. The peak height at a wavelength of 589 nm was used to evaluate the sodium content.

Extractable Perfluorinated Alkanoic Acids:

The polymer latex (dispersion obtained after polymerization; (sample size can be, for example: 1000 ml dispersion with solid content of about 30%) is freezed dried to remove the water after spiking with a surrogate recovery standard (SRS) $^{13}C_4$-PFOA (perfluorooctanoic acid having 4 of its carbon atoms replaced by $^{13}C$ isotopes) at a concentration of 25 ppb based on solid content of the dispersion. The freeze-dried polymer material is treated with methanol (1 g polymer+3 ml methanol, 16 h @ 250 rpm and 50° C.) to extract perfluorinated alkanoic acids. The extract is centrifuged (~10 min @ 4400 rpm) and an aliquot of the supernatant was transferred into a 2 ml autosampler vial.

The extract is analyzed for perfluorocarboxylic acids with reversed phase HPLC coupled with a triple quadrupole mass spectrometer (e.g. Agilent 6460 or ABSciex API 4000 QQQ-MS) in negative Multiple Reaction Mode (MRM) using analyte typical transitions, e.g. m/z 413 ->369 for PFOA. The HPLC (Agilent 1200 or 1260) is equipped with an Agilent C18 column (Zorbax Eclipse XDB-C18 4.6×50 mm 1.8 µm) and run in gradient mode with high purity water and methanol @ 50° C., both solvents are LC-MS grade and modified with 10 mmol ammonium acetate (gradient 15% MeOH ->100% MeOH). The analytes are quantified using equivalent or similar isotope labelled internal standards (e.g. $^{13}C_8$-PFOA as internal standard for PFOA) in a calibration range of 0.5-200 ng/ml analyte in methanolic extract, resulting in a lower level of quantification (LLOQ) related to polymer of 1.5 ppb and an upper limit of quantification (ULOQ) of 600 ppb. Analytes with concentrations higher than ULOQ are diluted with methanol into the calibration range and the analysis is repeated.

Illustrative Example 1 (Not Claimed)

A polymer of Tetrafluoroethylene (TFE), Hexafluoropropylene (HFP) and $CF_2$=$CF$—$CF_2$—$O$—$(CF_2)_3$—$OCF_3$ (MA-31) was prepared:

A 52-L-polymerization kettle with an impeller agitator was charged with 30 L deionized water, 50 g aqueous ammonia-solution (25 wt. %) and 465 g of a 30 wt. % aqueous solution of ammonium 4,8-dioxa-3-H-perfluorononanoate ($CF_3$—$O$—$(CF_2)_3$—$O$—$CFH$—$CF_2$—$COONH_4$, prepared as described in "Preparation of Compound 11" in U.S. Pat. No. 7,671,112). The oxygen-free kettle was then heated to 90° C., the agitation system was set to 275 rpm and 340 mbar (34 kPa) of methane ($CH_4$) was added. MA-31 (95 g) of was added, and TFE/HFP at a ratio of 46.6/53.4 mol % was added until a final pressure of 17.0 bar (1700 kPa) was reached. The polymerization was initiated by adding 2.5 g ammonium peroxydisulfate (APS), dissolved in 100 mL $H_2O$. The polymerization temperature was maintained at 90° C., and the pressure was kept at 17 bar. The monomer feed was constant; overall 6.3 kg TFE, 0.76 kg HFP and 38 g MA31 were fed. A solution of 8.5 g APS in 500 mL $H_2O$ was also fed after polymerization had started; feeding of APS was continued until 95% of the total monomer was consumed. The total runtime was 4 hours and 15 minutes. The obtained latex had a solid content of 19.4 wt. %, and the average particle size was 209 nm. The solids were isolated by freeze-coagulation, washed with deionized water and dried for 16 hours at 120° C. to provide the polymer. The MFI (372° C./5 kg) was 29 g/10 min; the melting point was 273° C.; the MA-31-content was determined as 0.4 wt. %; and the HFP-content was determined as 11 wt. %.

The end groups per $10^6$ carbon atoms were: COOH isolated=475, COOH assoc=180. The polydispersity $M_W/M_N$ was determined as 1.68, and the ion content was Na<5 ppm and K<5 ppm.

Reference Example 1a (Not Claimed)

For comparison: a similar FEP-polymer (MFI 27) modified with the same amount of $CF_2$=$CF$—$O$—$(CF_2)_3$—$OCF_3$ (MV-31) but polymerized at the lower temperature of 70° C. had more end groups per $10^6$ carbon atoms: COOH isolated 500; COOH assoc=175; COF=10. $CF_2$=$CFO$ $(CF_2)_3$ OCF (MV-31) was prepared according to the method described in U.S. Pat. No. 6,255,536 (Worm et al.).

Illustrative Example 2 (Not Claimed)

Post-Fluorination of the Dried Polymer of Example 1

A 10-L-post-fluorination reactor was charged with 100 g of the dried polymer of Example 1. The oxygen-free reactor was then heated up to 200° C. Then the reactor was evacuated to 0.250 bar absolute (25 kPa). The vacuum was broken up to a pressure of 0.99 bar absolute (99 kPa) with a fluorine gas/nitrogen gas mixture (10 vol. %/90 vol. %, N50, Air Liquide; München/Germany). After 30 minutes reaction time, the fluorine/nitrogen mixture was evacuated to a pressure of 0.250 bar absolute (25 kPa). This process was repeated 4 times. Afterwards the reactor was vented and flushed with $N_2$ in thirty cycles. The end groups per $10^6$ carbon atoms were determined on a 0.5 mm film: COOH, assoc.=1; COF=1.

Illustrative Example 3 (Not Claimed)

A polymer of TFE, HFP and $CF_2$=CF—$CF_2$—O—$C_3F_7$ (MA-3) was prepared. The polymerization procedure was the same as described in Example 1. The reactor was heated to 90° C., and 300 mbar (30 kPa) of $CH_4$ were added. 90 g of MA-3 were added, followed by TFE/HFP (ratio 46.6/53.4 mol %) until 17 bar (1700 kPa) pressure was obtained. The polymerization was initiated by adding 2.6 g APS in 200 mL $H_2O$. The polymerization temperature was maintained at 90° C. and the pressure was kept constant at 17 bar (1700 kPa) by feeding constantly TFE, HFP, MA-3 to the kettle (overall 6.4 kg TFE, 0.77 kg HFP and 45 g MA-3 were fed). A solution of 13.0 g APS in 250 mL $H_2O$ was fed after polymerization has started (noticeable by a pressure drop) until 95% monomer consumption. After 4 hours and 35 minutes, a latex with a solid content of 19.6 wt. % was obtained; the average particle size was 200 nm. After work-up and post-fluorination using the method described in Example 2, the obtained polymer had an MFI of 26 g/10 min, a melting point of 268° C., an MA-3-content of 0.5 wt. %, and an HFP content of 12 wt. %. The end groups per $10^6$ carbon atoms were determined after post-fluorination: COOH, assoc.=4; COF=1. The polydispersity was 1.73, and the ion content was Na<5 ppm and K<5 ppm.

Various modifications and alterations of this disclosure may be made by those skilled in the art without departing from the scope and spirit of the disclosure, and it should be understood that this invention is not to be unduly limited to the illustrative embodiments set forth herein.

Embodiment 1. A copolymer comprising tetrafluoroethylene units and units independently represented by formula

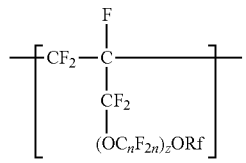

in a range from 0.2 to 12% by weight percent, based on the total weight of the copolymer, wherein n is independently from 1 to 6, z is 0, 1, or 2, and Rf is a linear or branched perfluoroalkyl group having from 1 to 8 carbon atoms and optionally interrupted by one or more —O— groups, wherein the copolymer has a melt flow index in a range from 1 to 19 grams per 10 minutes.

Embodiment 2. The copolymer of embodiment 1, further comprising from 5 to 22% by weight based on the total weight of the polymer of units derived from hexafluoropropylene copolymer.

Embodiment 3. The copolymer of embodiment 1, further comprising units represented by formula

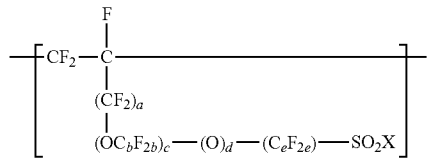

wherein a is 0 or 1, each b is independently from 1 to 4, c is 0 to 4, d is 0 or 1, e is 1 to 6, and X is independently —F, —$NH_2$, —OH, or —OZ, and wherein Z is independently a metallic cation or a quaternary ammonium cation.

Embodiment 4. The copolymer of embodiment 1, wherein Rf is —$CF_3$, and wherein n is 1 or 3.

Embodiment 5. The copolymer of embodiment 1, wherein z is 1 or 2.

Embodiment 6. The copolymer of embodiment 1, wherein z is 0.

Embodiment 7. The copolymer of embodiment 1, comprising the units independently represented by formula

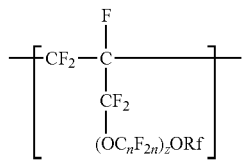

in a range from 0.02 to 1.9 mole percent based on the total amount of the copolymer.

Embodiment 8. The copolymer of embodiment 1, further comprising units derived from at least one perfluorinated terminal olefin independently having from 3 to 8 carbon atoms.

Embodiment 9. The copolymer of embodiment 1, wherein the copolymer has up to 200 —$SO_2X$ groups per $10^6$ carbon atoms and up to 100 unstable end groups per $10^6$ carbon atoms, wherein X is independently —F, —$NH_2$, —OH, or —OZ, wherein Z is independently a metallic cation or a quaternary ammonium cation, wherein the unstable end groups are selected from —COOM, —$CH_2OH$, —COF, and —$CONH_2$, and wherein M is independently an alkyl group, a hydrogen atom, a metallic cation, or a quaternary ammonium cation.

Embodiment 10. The copolymer of embodiment 1, wherein the copolymer has up to 200 —$SO_2X$ groups per $10^6$ carbon atoms and up to 100 unstable end groups per $10^6$ carbon atoms, wherein X is independently —F, —$NH_2$, —OH, or —OZ, wherein Z is independently a metallic cation or a quaternary ammonium cation, wherein the unstable end groups are selected from —COOM, —$CH_2OH$, —COF, and —$CONH_2$, and wherein M is independently an alkyl group, a hydrogen atom, a metallic cation, or a quaternary ammonium cation and wherein the —$SO_2X$ groups comprise —$SO_2X$ end groups.

Embodiment 11. The copolymer of embodiment 1, wherein at least one of the following limitations is met: the copolymer further comprises units derived from hexafluoropropylene and the units are present in the copolymer at 10 percent to 17 percent by weight, based on the total weight of the copolymer and the copolymer has a melting point in a range from 220° C. to 285° C.

Embodiment 12. The copolymer of embodiment 1, being provided as an aqueous dispersion comprising the copolymer.

Embodiment 13. A method of making an extruded article, the method comprising extruding a melted composition comprising the copolymer of embodiment 1.

Embodiment 14. An extruded article comprising the copolymer of embodiment 1.

Embodiment 15. The method of embodiment 13, wherein the extruded article comprises at least one of a film, tube, pipe, or hose.

Embodiment 16. The method of embodiment 13, wherein the extruded article is a conductor having the copolymer extruded thereon.

Embodiment 17. The extruded article of embodiment 14, wherein the extruded article comprises at least one of a film, tube, pipe, or hose.

Embodiment 18. The extruded article of embodiment 14, wherein the extruded article is a conductor having the copolymer extruded thereon.

Embodiment 19. A method of making the copolymer of embodiment 1, the method comprising copolymerizing components comprising tetrafluoroethylene and at least one compound independently represented by formula $CF_2=CFCF_2(OC_nF_{2n})_zORf$, wherein n is independently from 1 to 6, z is 0, 1, or 2, and Rf is a linear or branched perfluoroalkyl group having from 1 to 8 carbon atoms and optionally interrupted by one or more —O— groups.

What is claimed is:

1. A copolymer comprising
at least 66% by weight based on the total weight of the copolymer of tetrafluoroethylene units;
units independently represented by formula

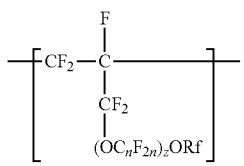

in a range from 0.2 to 12% by weight, based on the total weight of the copolymer, wherein n is independently from 1 to 6, z is 0, 1, or 2, and Rf is a linear or branched perfluoroalkyl group having from 1 to 8 carbon atoms and optionally interrupted by one or more —O— groups;
from 5 to 22% by weight based on the total weight of the copolymer of units derived from hexafluoropropylene; and
units represented by formula

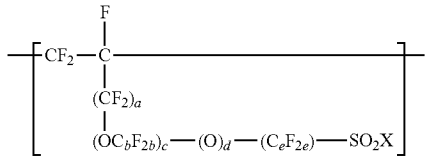

wherein a is 0 or 1, each b is independently from 1 to 4, c is 0 to 4, d is 0 or 1, e is 1 to 6, and X is independently —F, —NH$_2$, —OH, or —OZ, and wherein Z is independently a metallic cation or a quaternary ammonium cation,
wherein the copolymer has a melt flow index in a range from 1 to 19 grams per 10 minutes; and
wherein the copolymer has up to 200 —SO$_2$X groups per 10$^6$ carbon atoms and up to 100 unstable end groups per 10$^6$ carbon atoms, wherein X is independently —F, —NH$_2$, —OH, or —OZ, wherein Z is independently a metallic cation or a quaternary ammonium cation, wherein the unstable end groups are selected from —COOM, —CH$_2$OH, —COF, and —CONH$_2$, and wherein M is independently an alkyl group, a hydrogen atom, a metallic cation or a quaternary ammonium cation.

2. The copolymer of claim 1, wherein Rf is —CF$_3$, and wherein n is 1 or 3.

3. The copolymer of claim 1, wherein z is 1 or 2.

4. The copolymer of claim 1, wherein z is 0.

5. The copolymer of claim 1, comprising the units independently represented by formula

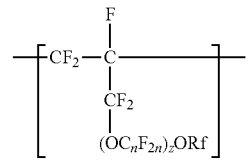

in a range from 0.02 to 1.9 mole percent based on the total amount of the copolymer.

6. The copolymer of claim 1, further comprising units derived from at least one perfluorinated terminal olefin independently having from 4 to 8 carbon atoms.

7. The copolymer of claim 1, wherein the —SO$_2$X groups comprise —SO$_2$X end groups.

8. The copolymer of claim 1, wherein
(i) the copolymer comprises 10 percent to 17 percent by weight, based on the total weight of the copolymer of the units derived from hexafluoropropylene and
(ii) the copolymer has a melting point in a range from 220° C. to 285° C.

9. The copolymer of claim 1, being provided as an aqueous dispersion comprising the copolymer.

10. A method of making an extruded article, the method comprising extruding a melted composition comprising the copolymer of claim 1.

11. The method of claim 10, wherein the extruded article comprises at least one of a film, tube, pipe, or hose.

12. The method of claim 10, wherein the extruded article is a conductor having the copolymer extruded thereon.

13. An extruded article comprising the copolymer of claim 1.

14. The extruded article of claim 13, wherein the extruded article comprises at least one of a film, tube, pipe, or hose.

15. The extruded article of claim 13, wherein the extruded article is a conductor having the copolymer extruded thereon.

16. A method of making the copolymer of claim 1, the method comprising copolymerizing components comprising tetrafluoroethylene; at least one compound independently represented by formula $CF_2=CFCF_2(OC_nF_{2n})_zORf$, wherein n is independently from 1 to 6, z is 0, 1, or 2, and Rf is a linear or branched perfluoroalkyl group having from 1 to 8 carbon atoms and optionally interrupted by one or more —O— groups; hexafluoropropylene; and a monomer resulting in units of

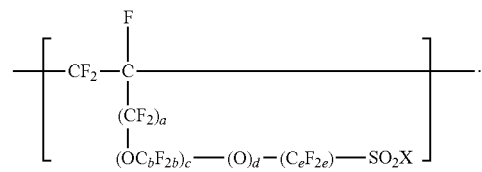

* * * * *

UNITED STATES PATENT AND TRADEMARK OFFICE
CERTIFICATE OF CORRECTION

PATENT NO. : 11,028,198 B2
APPLICATION NO. : 16/325831
DATED : June 8, 2021
INVENTOR(S) : Harald Kaspar It is certified that error appears in the above-identified patent and that said Letters Patent is hereby corrected as shown below:

In the Specification

Column 9
Line 16, Delete "Fit" and insert -- $H^+$. --, therefor.

Column 18
Line 49 (approx.), Delete "rel" and insert -- $\varepsilon_{rel}$ --, therefor.

Column 20
Line 32, Delete "r$_i$o," and insert -- $\eta_0$, --, therefor.
Line 44 (approx.), Delete "M3.6" and insert -- $M^{3.6}$ --, therefor.
Line 49 (approx.), Delete "CMWD=100x{1-[G''(ω)/$G_N^0$]$^{0.5}$}." and insert
-- CMWD=100x{1-[G'(ω)/$G_N^0$]$^{0.5}$}. --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*